No. 706,756. Patented Aug. 12, 1902.
D. C. JACKLING.
ORE ROASTING FURNACE.
(Application filed Aug. 2, 1901.)
(No Model.) 12 Sheets—Sheet 2.
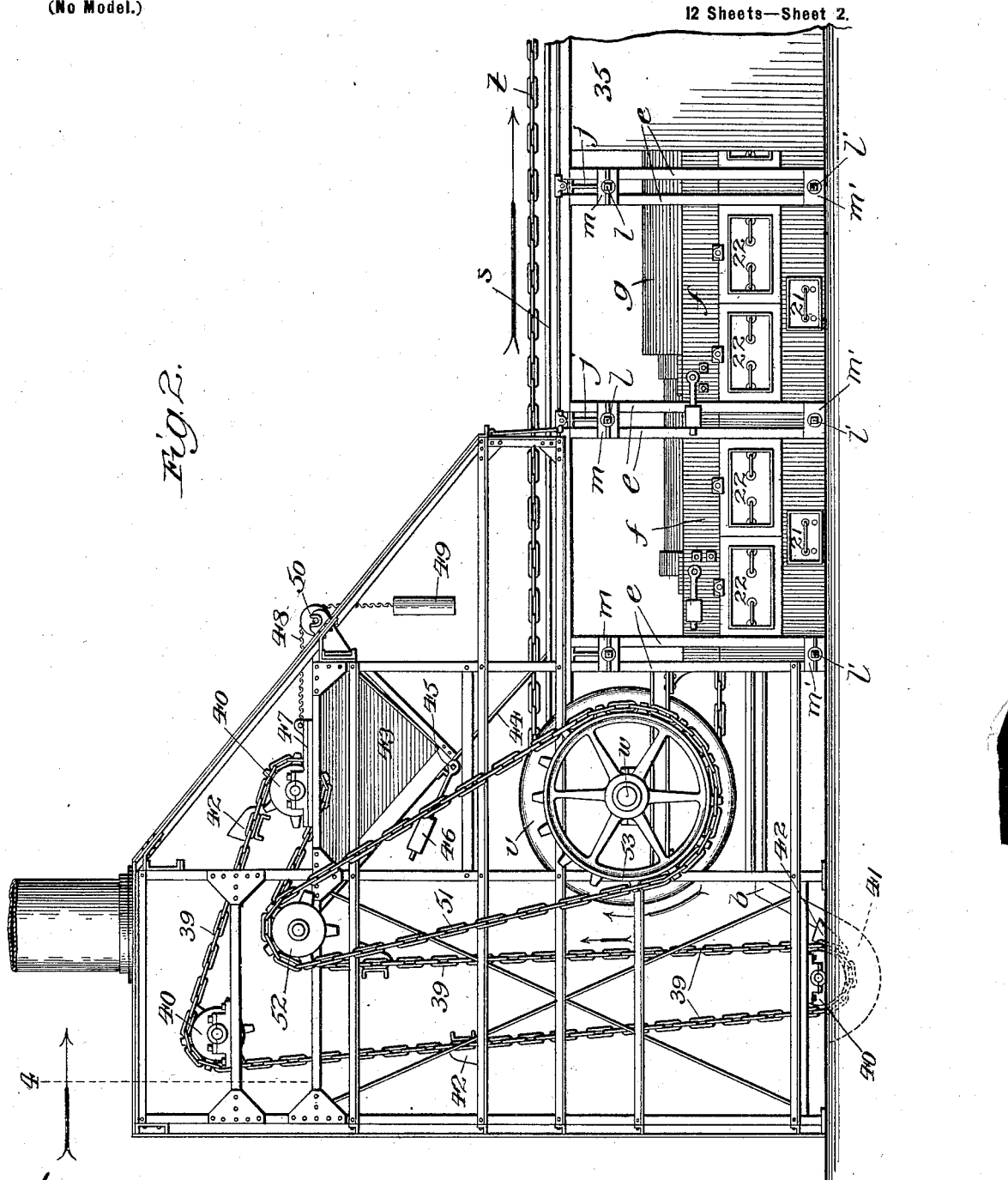
Witnesses:
Inventor,
Daniel C. Jackling,
By Thomas F. Sheridan,
Atty.

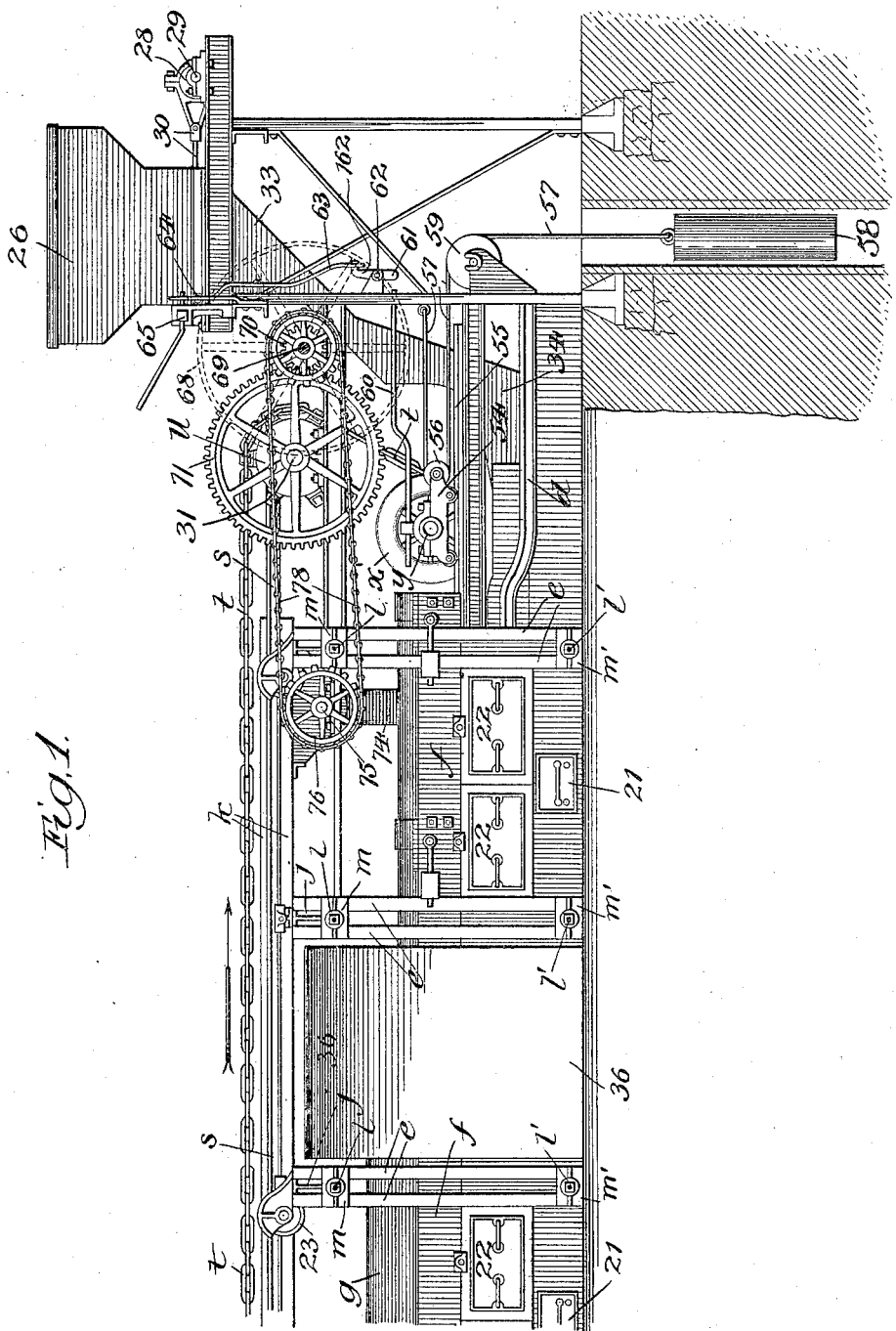

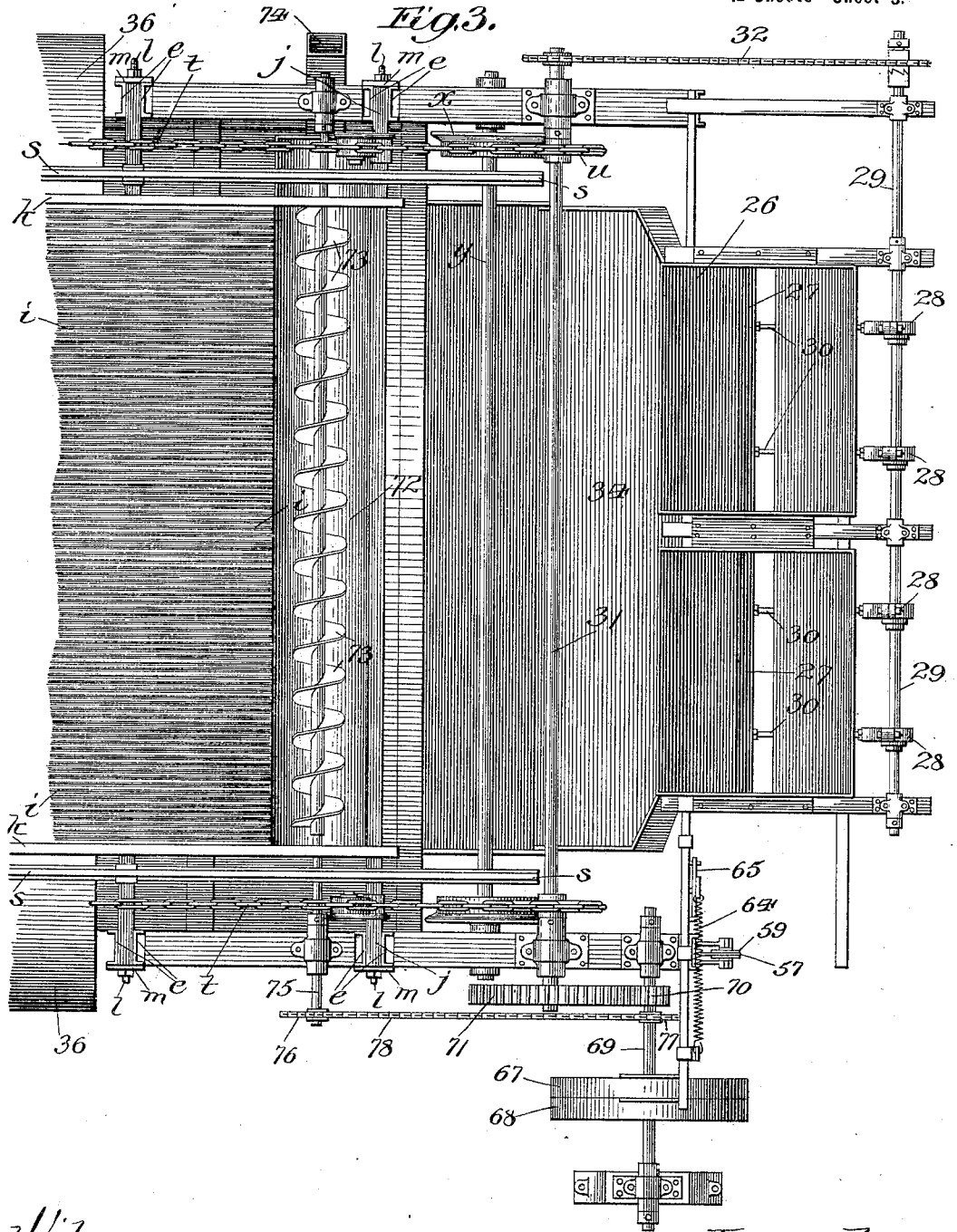

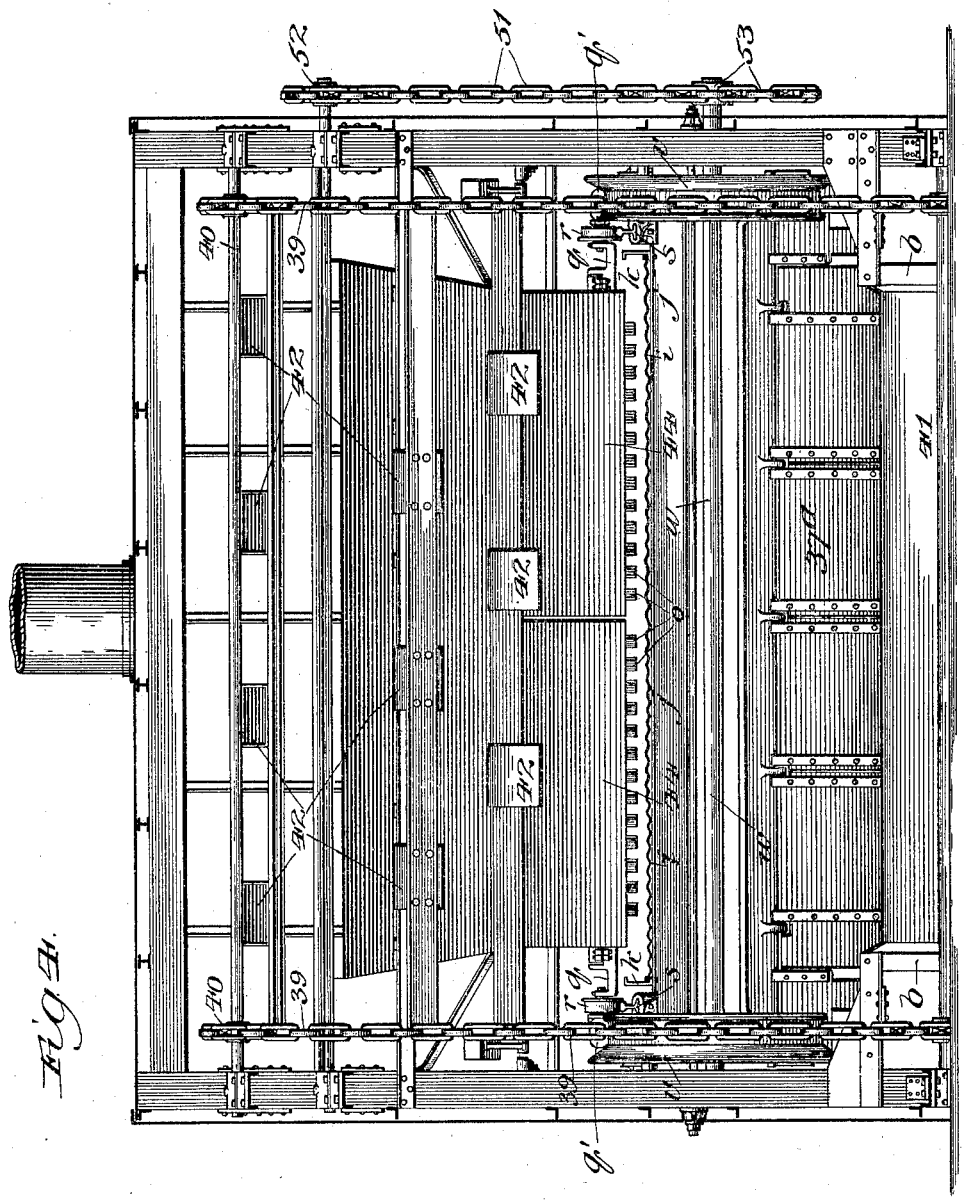

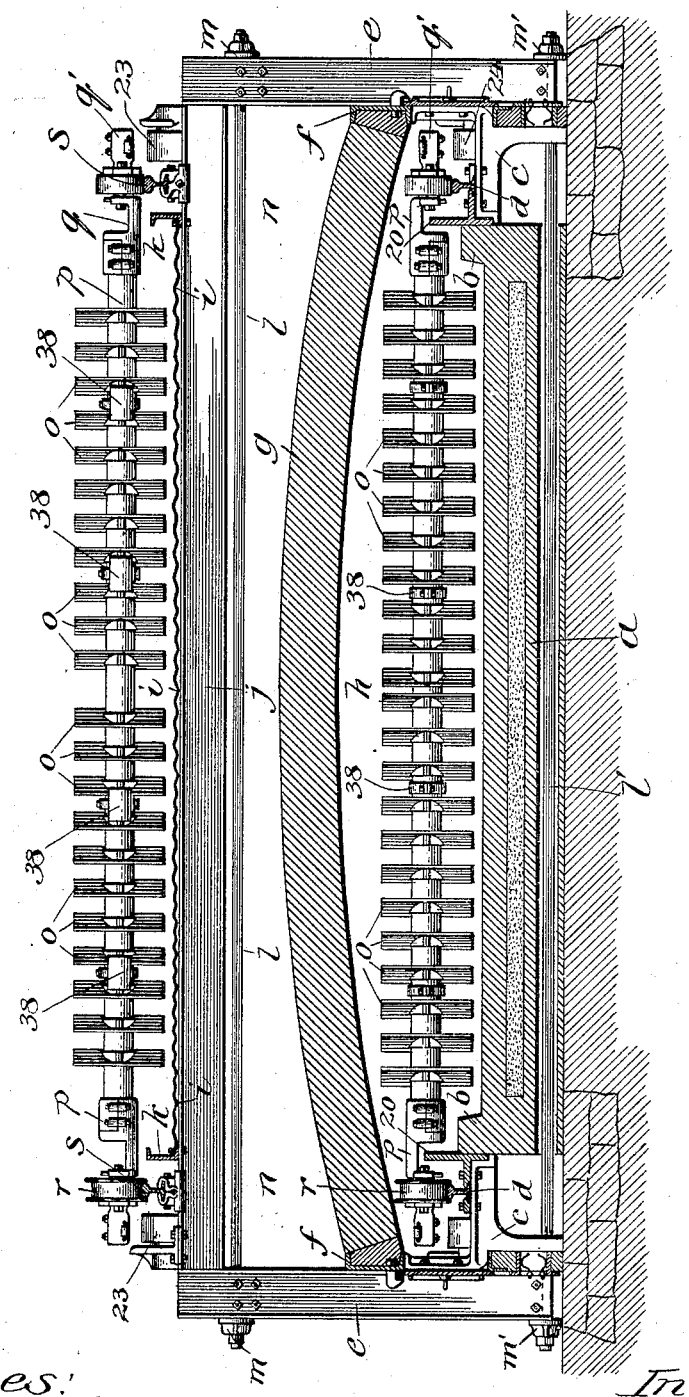

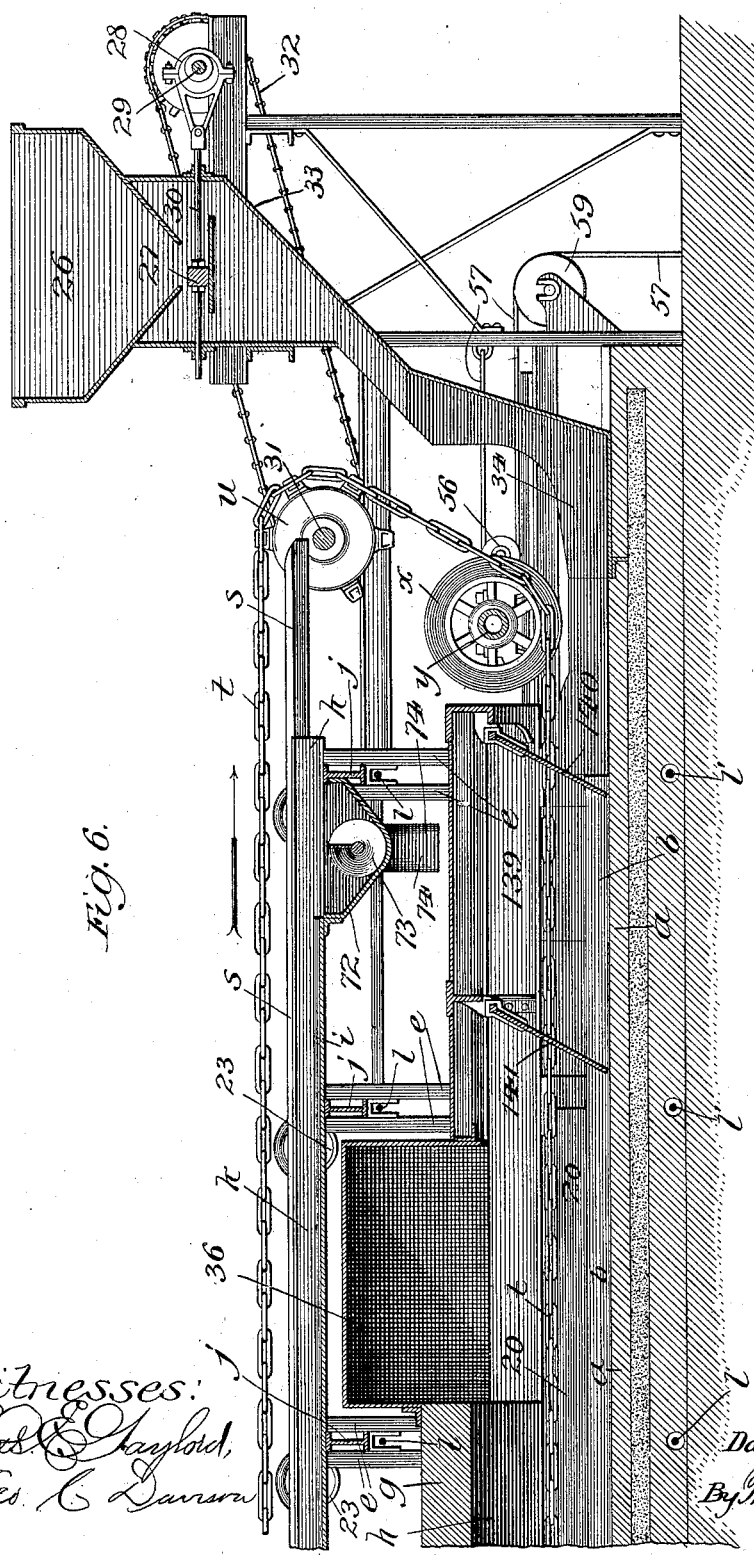

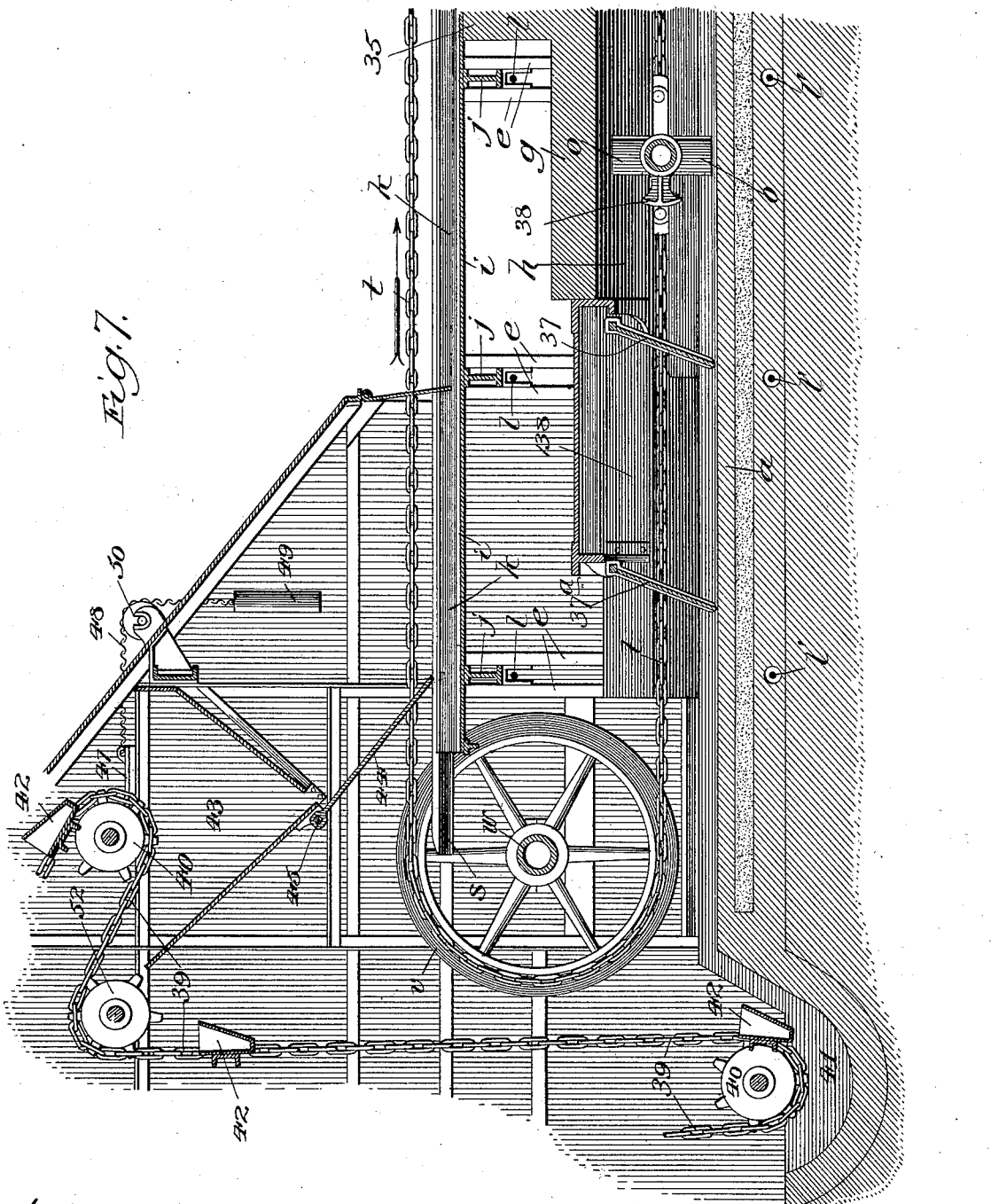

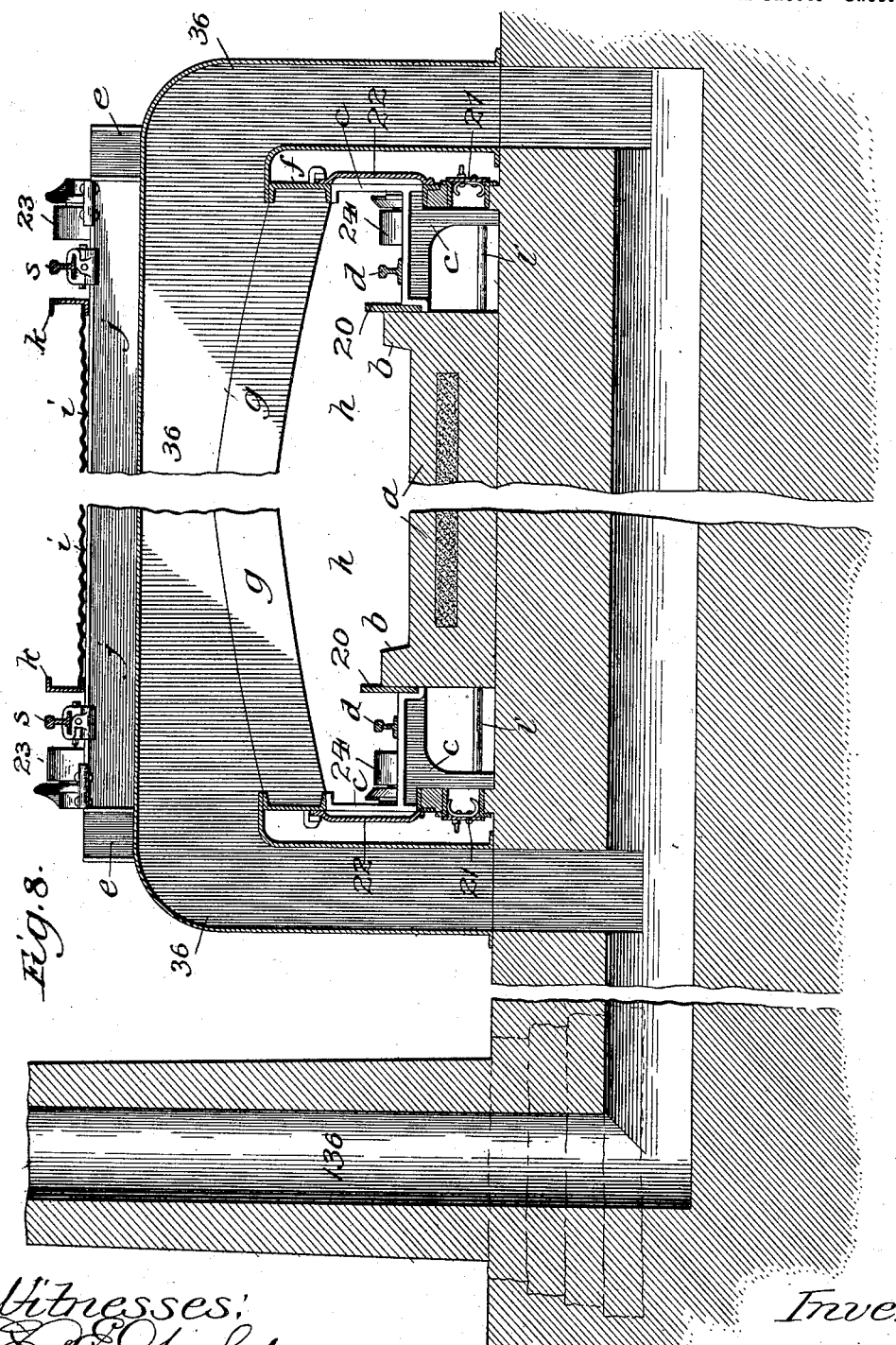

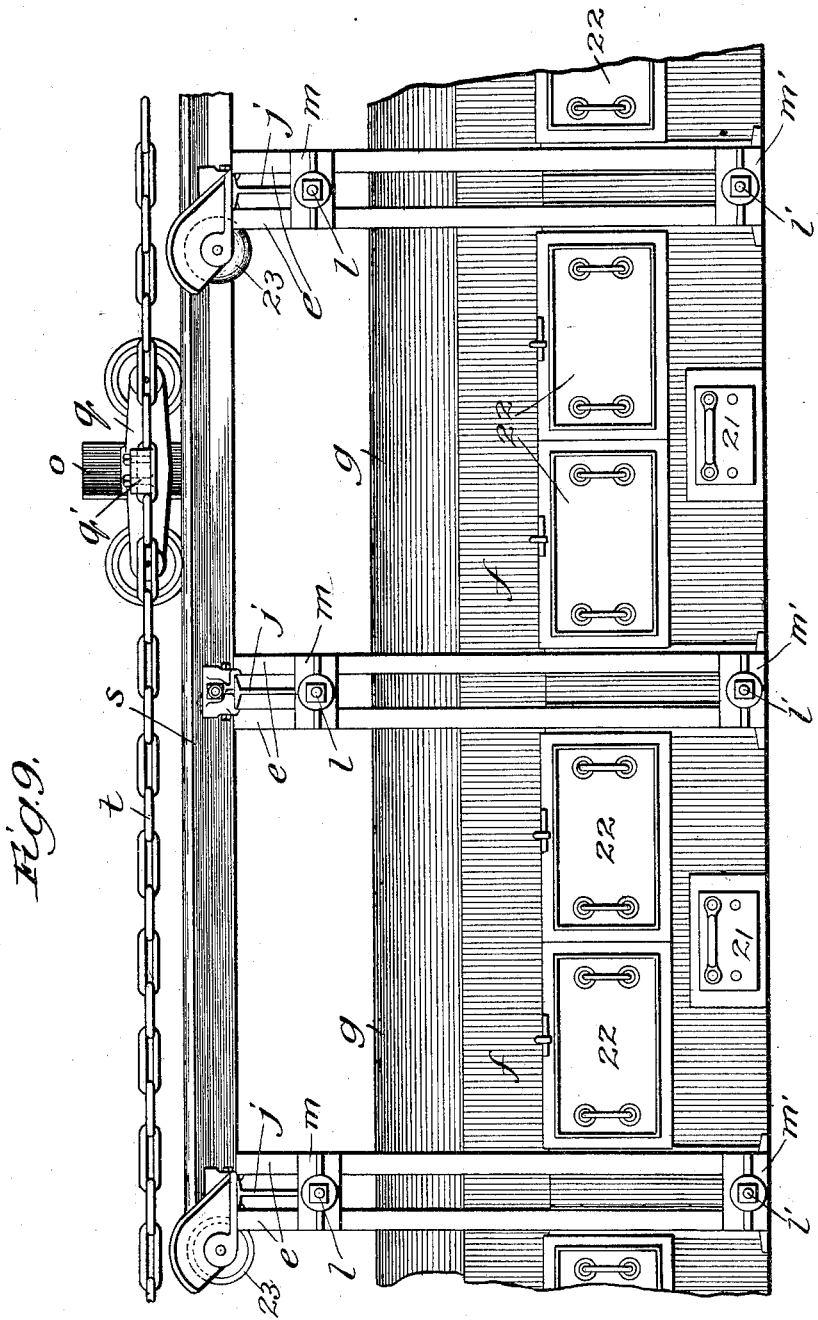

No. 706,756. Patented Aug. 12, 1902.
D. C. JACKLING.
ORE ROASTING FURNACE.
(Application filed Aug. 2, 1901.)
(No Model.) 12 Sheets—Sheet 10.
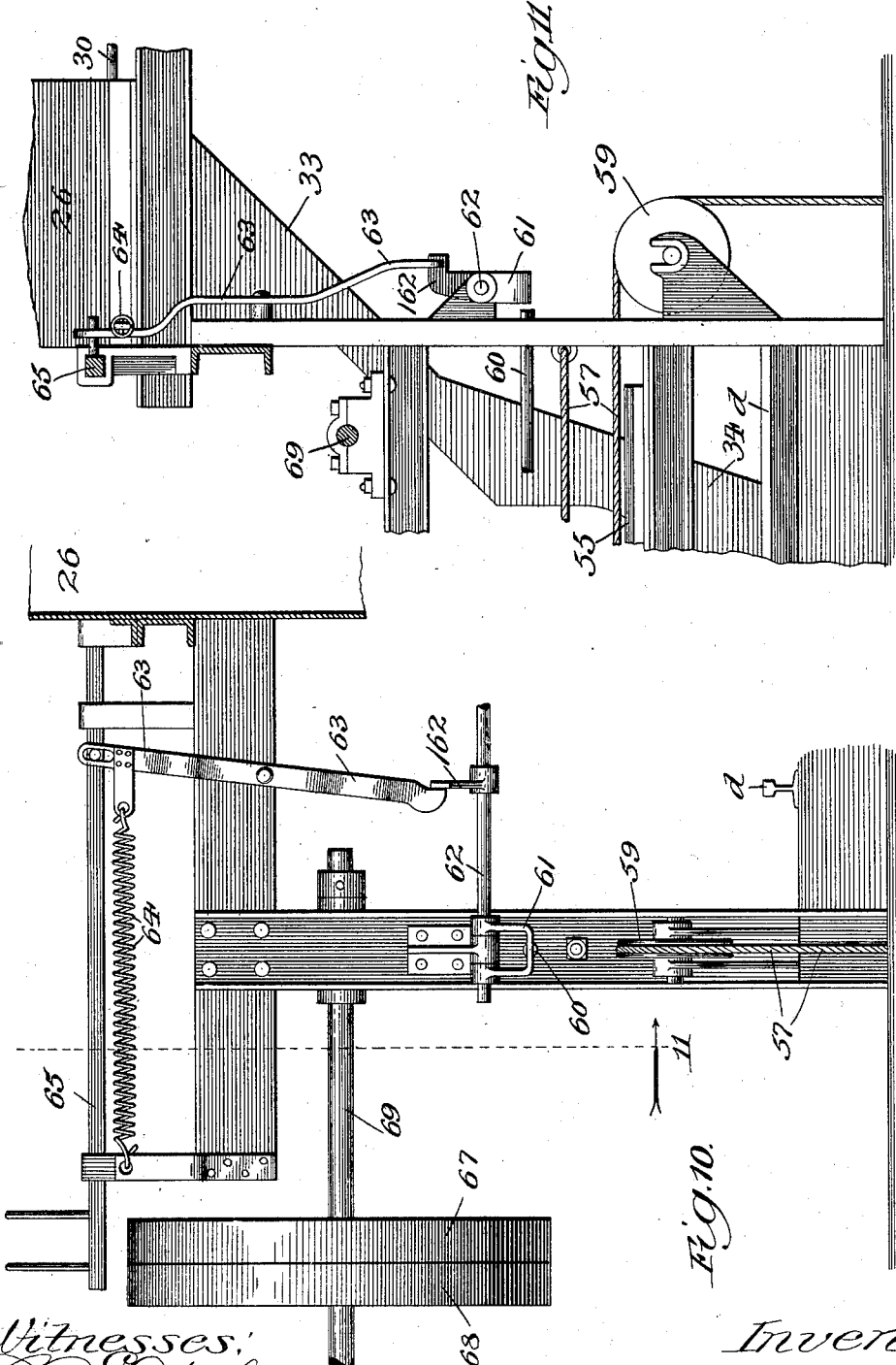
Witnesses:
Inventor:
Daniel C. Jackling,
By Thomas F. Sheridan,
Atty.

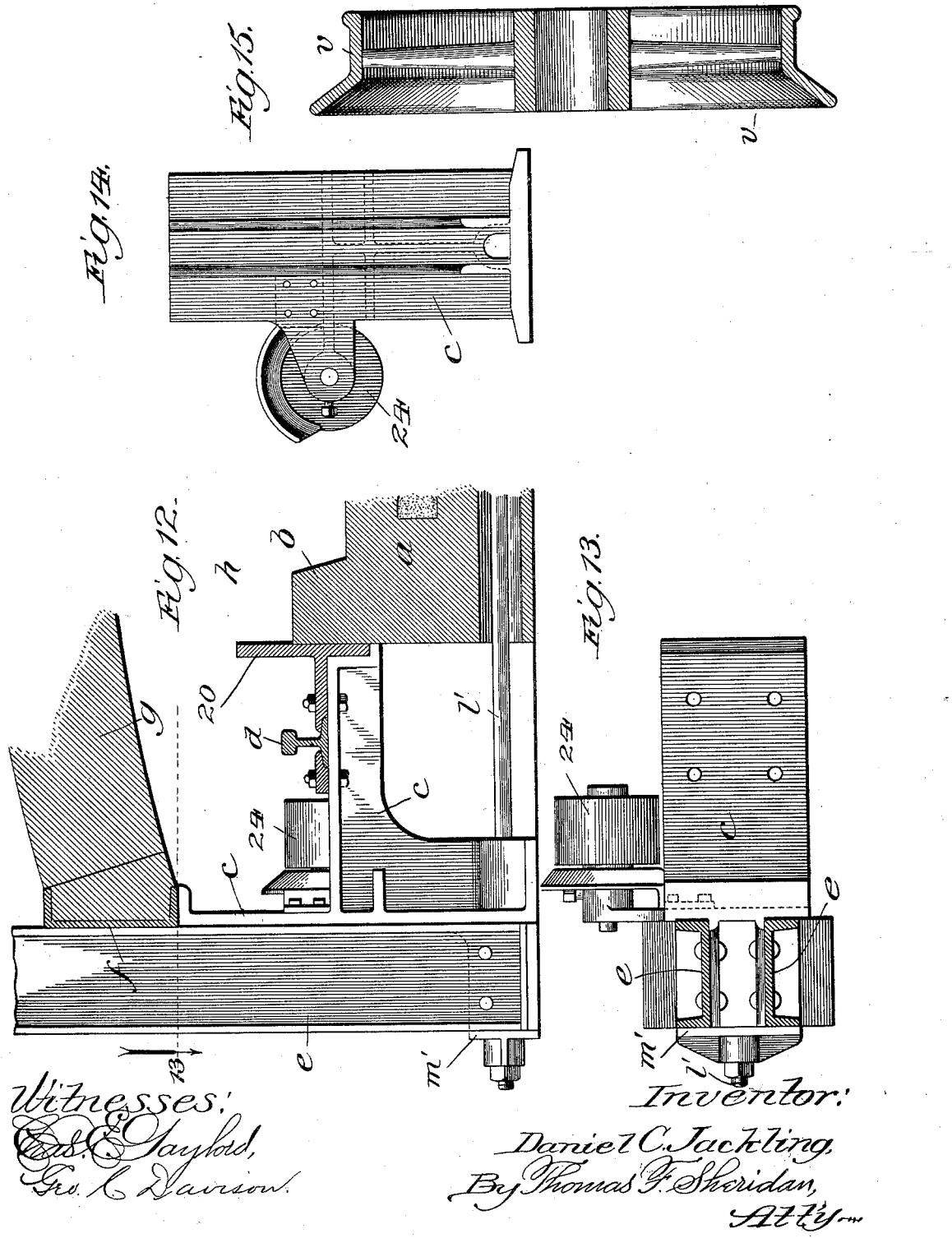

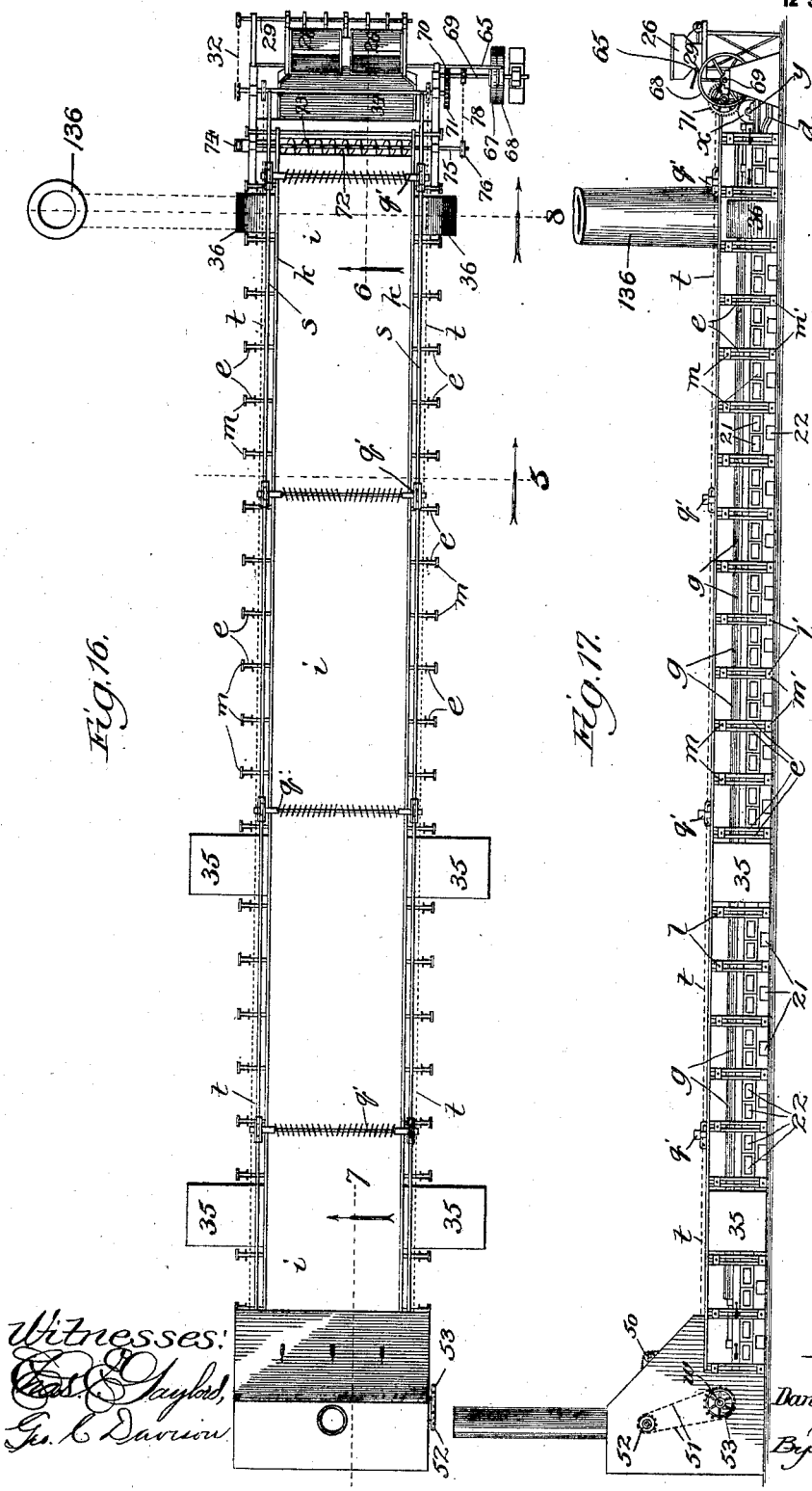

UNITED STATES PATENT OFFICE.

DANIEL C. JACKLING, OF REPUBLIC, WASHINGTON.

ORE-ROASTING FURNACE.

SPECIFICATION forming part of Letters Patent No. 706,756, dated August 12, 1902.

Application filed August 2, 1901. Serial No. 70,644. (No model.)

*To all whom it may concern:*

Be it known that I, DANIEL C. JACKLING, a citizen of the United States, residing at Republic, in the county of Ferry and State of Washington, have invented certain new and useful Improvements in Ore-Roasting Furnaces, of which the following is a specification.

The invention relates to that class of furnaces which are constructed to receive ore in a broken condition and bake or roast the same, and particularly to that class of furnaces known as "straight-line" furnaces, in which the ore is received at one end and dumped at the other, all of which will more fully hereinafter appear.

The principal object of the invention is to provide a simple, economical, and efficient straight-line furnace.

A further object is to provide a straight-line furnace with an ore-roasting hearth which is substantially independent of all the other mechanisms, so that it may contract, expand, warp, or settle without being interfered with or in any way interfering with the efficiency of the supporting and operative mechanisms.

A further object is to provide a straight-line ore-roasting furnace with a roasting-hearth in which the material is fed in at one end and dumped at the other, with a supplemental corrugated cooling-hearth, and with means for transferring or conveying the roasted material to the cooling-hearth, upon which it may be distributed, moved, and cooled.

Further objects will appear from an examination of the drawings and the following description and claims.

The invention consists principally in a furnace of the class described in which there is combined an ore-roasting hearth and mechanisms free and independent of such hearth for supporting the operative mechanisms.

The invention consists, further, in the combination of an ore-roasting hearth, a cooling-hearth arranged parallel therewith, and endless-belt conveyer for transferring the roasted material from the roasting-hearth to the cooling-hearth.

The invention consists, further, in the combination of an ore-roasting hearth, a cooling-hearth arranged above and in parallelism therewith, endless-belt elevating mechanism for transferring the roasted ore to the cooling-hearth, and rabble mechanism for agitating and moving the material along both hearths.

The invention consists, further and finally, in the features, combinations, and details of construction hereinafter described and claimed.

In the accompanying drawings, Figure 1 is a side elevation of one end of the furnace, the feeding end; Fig. 2, a side elevation of the opposite end, the so-called "discharging" end; Fig. 3, a plan view of the feeding end of the furnace looking at it from above; Fig. 4, an end elevation, partly in section, taken on line 4 of Fig. 2 looking in the direction of the arrow; Fig. 5, an enlarged cross-sectional elevation of the furnace, taken on line 5 of Fig. 16; Fig. 6, an enlarged sectional elevation of the feed end of the furnace, taken on line 6 of Fig. 16; Fig. 7, an enlarged sectional elevation taken through the discharge end of the furnace on line 7 of Fig. 16 looking in the direction of the arrow; Fig. 8, an enlarged cross-sectional broken elevation taken on line 8 of Fig. 16 looking in the direction of the arrow; Fig. 9, an enlarged sectional elevation of a portion of one side of the furnace; Fig. 10, an end elevation of a portion of a furnace-frame, showing the means for automatically shipping the driving-belt from a tight to a loose pulley; Fig. 11, a sectional elevation taken on line 11 of Fig. 10; Fig. 12, an enlarged cross-sectional detail taken transversely through a portion of the furnace, showing a part of the roasting-hearth, tracks, and supporting side brackets and post; Fig. 13, a plan sectional view taken on line 13 of Fig. 12; Fig. 14, a side elevation of one of the supporting-brackets and idler-pulleys; Fig. 15, a cross-sectional view of the large sheave-pulley; Fig. 16, a plan view of the complete furnace constructed in accordance with these improvements, and Fig. 17 a side elevation of the complete furnace shown in Fig. 16.

In the art to which this invention relates it is well known that the roasting-hearth upon which the material is baked and roasted is subjected to very high temperatures, so much so that it is liable to expand, warp, or settle, and if the elements which support the operative mechanisms be supported thereby or attached thereto their efficiency is thereby impaired. One of the principal objects, therefore, of this invention is to overcome these objections, and in order to accomplish this I make an ore-roasting hearth $a$ of the desired width and thickness and laid upon the usual foundation, either earth, concrete, or masonry, as may seem desirable or necessary. This hearth is provided with laterally and upwardly extending projections $b$, which assist in limiting the side movement of the material and keeping it in contact with the agitators and stirrers, as hereinafter described.

To provide means for supporting the operative mechanisms independent of the roasting-hearth, a plurality of side brackets $c$ is provided. These brackets rest upon the masonry, as shown particularly in Fig. 5, upon which the rails $d$ are secured, the side brackets being further secured in any desired manner to vertical posts $e$, preferably formed of two channel-beams arranged back to back and bolted together, as shown particularly in Figs. 1 and 5. Secured in longitudinal supporting channel-beams $f$ is an arched roof $g$, which incloses the oar-roasting hearth and completes the ore-roasting chamber $h$, so as to confine the heat therein and in contact with the material to be roasted.

It is desirable in this class of furnaces that some means be provided for the cooling of the material after it has passed through the ore-roasting hearth, and to accomplish this result I prefer to provide a supplementary cooling-hearth $i$, formed of corrugated sheet-iron, as shown particularly in Fig. 5, and which is arranged parallel with and above the ore-roasting furnace, as shown in Fig. 5, in the open air. This cooling-hearth is supported by I-beams $j$, arranged transversely of the furnace and riveted or otherwise secured to the upper ends of the side posts. To confine the material upon this corrugated cooling-hearth, a pair of channel-beams $k$ is arranged longitudinally and at each lateral edge thereof, as shown particularly in Fig. 5; otherwise the material would be thrown off the side of the furnace and down upon the ground or arched wall.

To tie the structure together at the top, a plurality of stay-bolts $l$ is provided and passed between the upright posts, as shown in Fig. 1, and by means of the washers and nuts $m$ are clamped to such side posts. These upper stay-rods are passed through the space $n$ between both hearths and are consequently protected from the heat of the hearths. A second set of stay-rods $l'$ is provided and arranged transversely of the furnace at or near the lower part of the side posts and passed through the cylindrical openings immediately beneath the ore-roasting hearth, as shown particularly in Fig. 5, and is also provided with washers and nuts $m'$ to clamp the parts together. Both sets of stay-rods are therefore protected from the heat and their efficiency increased to resist the lateral strains to which the furnace is exposed.

To agitate, stir, and move the material along both hearths, a plurality of rabble blades or shoes $o$ is provided and secured to supporting-bars $p$, in turn supported by and secured to the rabble trucks or carriages $q$, having rolls or wheels $r$, that run upon the tracks $d$ and $s$, arranged parallel with the ore roasting and cooling hearths, respectively. To drive these rabble-trucks, a pair of endless sprocket-chains $t$ is provided and secured to such carriages at the outer ends thereof. These chains are passed around a pair of sprocket-wheels $u$ at the feed end of the furnace and a pair of large guiding sheave-pulleys $v$ at the opposite end. These sprocket-wheels and sheave-pulleys are so arranged that they keep the chains and other mechanisms during their operation in such position as to permit the rabble-carriages to move from one hearth to the other—that is, from the tracks parallel with the ore-roasting hearth to the tracks parallel with the cooling-hearth, and vice versa.

It is highly desirable that some means be provided so that as the rabble-carriages leave one track (the ore-roasting) they may be kept in such alinement as to readily enter upon the tracks parallel with the cooling-hearth, and vice versa. To provide for this result, the pair of large sheave-pulleys $v$ is provided and arranged upon a shaft $w$. A second pair of small sheave-pulleys $x$ is also provided and mounted upon a shaft $y$ immediately opposite the tracks parallel to the ore-roasting hearth and at the feed end of the furnace. Both of these sets of sheave-pulleys are provided with annular flanges at the outer lateral edges thereof, which are inclined, as shown in Fig. 15, so that as the rabble-trucks leave one set of tracks the outwardly-extending arms $q'$ will contact the inclined surface of such flanges, (see Fig. 4,) and thereby insure the proper positioning of the trucks to enter upon the next set of tracks. Incidentally such sheave-pulleys support the slack of the chains. It is also important that material being roasted, agitated, and moved along the ore-roasting hearth should not at any time be thrown upon the tracks, for the reason that it would be liable to derail the rabble-trucks, and thus break the chain or other mechanisms. To prevent such result, a pair of guard-rails or flanges 20 is provided and secured to the supporting-brackets, as shown particularly in Fig. 5, just inside of the tracks and adjacent to and in contact with the lateral edge of the ore-roasting hearth. These supporting-brackets are also arranged at some distance apart longitudinally, opposite each other, and secured to each pair of side posts, so that there is considerable open space between them, and should any material be forced over this guard-rail 20 it would fall down below the tracks and out of the way. It is desirable, therefore, that some means be provided by which this material may be taken out of the furnace whenever it accumulates. In order to accomplish this result, doors 21 are provided at the side walls of the furnace and between the side posts thereof. These doors are also useful in that when it is desirable to cool the furnace they may be removed and permit air to circulate through the same. A second set of doors 22 is provided in the side walls of the furnace opposite that part of the ore-roasting chamber in which the rabble-trucks move to permit an inspection and cooling of the mechanisms.

The sprocket-chains used in this style of furnace are made of wrought iron or steel, so as to withstand the high temperatures to which they are exposed, and as a consequence they are quite heavy and liable to sag between each set of rabble-trucks. In order to take up such "sag" and assist the movement of the chains, a plurality of small idler-pulleys 23 is arranged outside of and parallel to the tracks of the cooling-hearth, and a second set of idler-rolls 24 is provided outside of and parallel to the tracks in the ore-roasting hearth to take up the sag of the chain, assist its movement, and tend to keep the parts on the respective tracks, all of which will be understood and appreciated by those skilled in the art.

To feed the material into the furnace, a hopper 26 is provided. A reciprocating feeding-bar 27 is slidingly mounted upon the bottom plate of the hopper, so as to push a desired quantity of material to be roasted over the edge of the bottom plate at each movement thereof. Eccentrics 28 are mounted upon shafts 29 and are connected to the feeding bar or bars by means of the eccentric-rods 30. This eccentric-shaft is connected with the sprocket-driving shaft 31 by means of a sprocket-chain 32, so that when the furnace is in operation, and at such time only, the feeding mechanism is operated to permit the material to fall through in the desired quantities upon a chute 33, where it is delivered into a pit 34, from which it is scraped by means of the rabble blades or shoes into the ore-roasting hearth.

To supply the necessary heat, one end of the ore-roasting furnace is provided with two or more fire-boxes 35, extending outwardly from the side thereof, into which the fuel is fed and supported upon the usual grates, so that during its combustion the heat may enter into the roasting-chamber and travel along the same toward the feed end of the furnace, out of which it passes through downtakes 36, which are connected with the desired chimney 136. Instead of the downtakes, however, uptakes may be provided wherever desirable or necessary and passed over the furnace to the smoke-stack or chimney.

It is desirable to confine the heat and products of combustion as long as possible within the ore-roasting chamber, so as to obtain the greatest benefit therefrom and at the same time permit the rabble mechanisms and roasted material to pass out of the same at the desired time or times. To accomplish this, the discharge end of the furnace is provided with swinging doors 37 and 37$^a$, mounted transversely at or near the end thereof, (see Fig. 7,) so that as the rabble mechanisms move along with the roasted material the bumpers 38 on the rabble-supporting bars contact the first door, swing it outwardly, and hold it in open position until the rabble-blades have passed out of the roasting-chamber into a small or vestibule chamber 138, when such door is again permitted to drop into its closed position and prevent the escape of the hot gases. The continued movement of the parts causes the bumpers to contact the second door and hold it open while the rabble-blades are leaving the vestibule and the material being discharged. The supply end of the roasting-chamber is also provided with a vestibule-chamber 139, formed of and by the doors 140 and 141 and operated in the manner described above. (See Fig. 6.)

Means must also be provided to convey or transfer the discharged material from the discharging end of the ore-roasting hearth upwardly and onto the cooling-hearth, upon which it may be agitated and moved for cooling purposes. To accomplish this result, an endless conveyer is provided formed by a pair of chains or link belts 39, as shown particularly in Fig. 2, which chains are passed around sprocket-wheels 40. The material is dumped into a pit or trough 41, where it may be contacted and scraped out by the elevator-cups 42, carried upwardly and over into a hopper 43, from which it passes down upon a hinged apron 44 and onto the end of the cooling-hearth. This hinged apron 44 is pivoted at 45 and provided with a weighted lever-arm 46, so that as it is contacted by the rabble-carriages it may be moved upwardly and out of the way till the carriages pass upon the tracks parallel with the cooling-hearth. To keep such elevator-chain taut, one of the sprocket-wheels has its bearings upon a slide-block 47, which slide-block is provided with a chain 48, having a weight 49 thereon and passed over an idler-roll 50, all of which acts to keep the elevator-chain generally under the desired tension. The elevator is driven by means of the sprocket-chain 51, which is passed around a sprocket-wheel 52, mounted upon one of the supporting-shafts, and around a large sprocket-wheel 53 upon the shaft $w$, upon which the pair of large sheave-pulleys $v$ is mounted, so that the operation of the elevator is always assured when the rabble mechanism is in operation and at such times only.

Should one of the sprocket-chains that drive the rabble trucks or carriages become broken, it will be readily understood that unless some means be provided to stop the same the other parts are apt to become broken and cause an entanglement of the mechanisms to such an extent as to render it difficult to repair. It is therefore desirable to provide some means for automatically stopping the mechanism should either one of the sprocket-chains become broken. To accomplish this result, the shaft $y$ has its bearings in a block 54, as shown particularly in Fig. 1, which block is provided with trolley-wheels mounted upon tracks 55. This block is also provided with an idler-pulley 56, around which a weighted chain 57 is passed, which weighted chain is secured to the frame of the furnace at one end, provided with a weight 58 at the other end, and passed over an idler 59. Should either one or both of the chains become broken, the block is permitted to move outwardly, so that a pusher-rod 60 thereon will contact a U-shaped arm 61 upon a rock-shaft 62. The movement of this rock-shaft operates a holding-lever 162 and releases a shipping-lever 63. This action permits a tension-spring 64 to move the shipping-lever, and thereby a shipper-bar 65, to one side, so that a main driving-belt (not shown) may be moved from a tight pulley 67 to a loose pulley 68. These tight and loose pulleys are mounted upon a counter-shaft 69, which is provided with a spur-pinion 70, connected to the main shaft by means of a gear-wheel 71. It will therefore be seen that as soon as the carriage or block 54 is moved outwardly, so as to release the holding mechanism, the other mechanisms described operate to throw the main driving-belt from a tight to a loose pulley, and thereby stop the further movement of the parts.

The discharge end of the cooling-hearth is provided with a trough 72, in which a discharging-screw 73 is rotatably mounted, one end of such trough having a discharging-spout 74. The shaft 75, upon which the screw is mounted, carries a sprocket-wheel 76, connected with a sprocket 77 in the main shaft by means of a chain 78. The arrangement of parts is such that when the furnace is in operation, and at such times only, the material as it leaves the cooling-hearth is discharged to one side of the furnace and out of the way.

I claim—

1. In an ore-roasting furnace of the class described, the combination of an ore-roasting hearth, tracks arranged parallel therewith, and means for supporting such tracks independent of the ore-roasting hearth, substantially as described.

2. In an ore-roasting furnace of the class described, the combination of an ore-roasting hearth, a cooling-hearth arranged parallel with and above the ore-roasting hearth, tracks arranged parallel with and outside of both such hearths, and means for supporting the track mechanism and cooling-hearth independently of the roasting-hearth, substantially as described.

3. In an ore-roasting furnace of the class described, the combination of an ore-roasting hearth, a cooling-hearth arranged parallel with and above such ore-roasting hearth, an arched wall forming the roof of the ore-roasting chamber, a pair of tracks arranged parallel with and outside of each of such hearths, and a plurality of brackets and side posts supporting such track, cooling-hearth and arched roof independent of the ore-roasting hearth, substantially as described.

4. In an ore-roasting furnace of the class described, the combination of an ore-roasting hearth, a cooling-hearth arranged parallel with and above the ore-roasting hearth, a pair of tracks arranged outside of and parallel with both hearths, rabble mechanism movably mounted on such tracks, a plurality of side posts supporting the cooling-hearth independent of the ore-roasting hearth and formed of channel-irons arranged back to back with their web portions transverse of the furnace, and a plurality of side brackets secured to such side posts to support the tracks outside of the ore-roasting hearth and independent thereof, substantially as described.

5. In an ore-roasting furnace of the class described, the combination of an ore-roasting hearth, a cooling-hearth arranged parallel with and above the ore-roasting hearth, a pair of tracks arranged outside of and parallel with both of such hearths, a pair of rabble-trucks oppositely mounted upon such tracks and connected together by a rabble-supporting bar, rabble mechanism on such supporting-bar, link belts connecting together the rabble-trucks on each side of both such hearths in a continuous manner, driving-shaft mechanism provided with sprocket-wheels for operating such link belts, and flanged pulleys to receive the rabble-trucks as they leave one track and convey them opposite to and in alinement with the other set of tracks, substantially as described.

6. In an ore-roasting furnace of the class described, the combination of an ore-roasting hearth, a cooling-hearth arranged parallel with and above the ore-roasting hearth, a pair of tracks arranged outside of and parallel with both of such hearths, a pair of rabble-trucks oppositely mounted upon such tracks and connected together by a rabble-supporting bar, rabble mechanism on such supporting-bar, link belts connecting together the rabble-trucks on each side of both such hearths in a continuous manner, driving-shaft mechanism provided with sprocket-wheels for operating such link belts, flanged pulleys to receive the rabble-trucks as they leave one track and convey them opposite to and in alinement with the other set of tracks, a hinged door at the discharge end of the ore-roasting hearth, and bumper mechanism on the rabble-bars to contact such hinged door and hold it open as the rabble mechanism is passed out of the same, substantially as described.

7. In an ore-roasting furnace of the class described, the combination of an ore-roasting hearth, a cooling-hearth arranged parallel with and above the same, a hinged door arranged at each end of the ore-roasting hearth, a hopper provided with a hinged chute or apron arranged at the receiving end of the cooling-hearth to discharge the roasted material thereon, a pair of tracks arranged outside of and parallel with both of such hearths, a plurality of rabble-trucks oppositely mounted on each of such pairs of tracks, a pair of link belts connecting such rabble-trucks together in a continuous manner, rabble-supporting bars connecting each pair of trucks together, rabble mechanism on such bars for agitating and moving the material along both of such hearths, means for transferring the rabble mechanism from one pair of tracks to the other, bumper mechanism on such rabble-supporting bars to contact with the hinged doors and apron to raise the same and hold them in raised position until the rabble mechanism passes thereunder, and an endless flexible conveyer to receive the material from the ore-roasting chamber and convey it into the hopper at the end of the cooling-hearth, substantially as described.

8. In an ore-roasting furnace of the class described, the combination of an ore-roasting hearth, a cooling-hearth arranged parallel with and above the same, a hinged door arranged at each end of the ore-roasting hearth, a hopper provided with a hinged chute or apron arranged at the receiving end of the cooling-hearth, a pair of tracks arranged outside of and parallel with both of such hearths, a plurality of rabble-trucks oppositely mounted on each of such pairs of tracks, a pair of link belts connecting such rabble-trucks together in a continuous manner, rabble-supporting bars connecting each pair of trucks together, rabble mechanism on such bars for agitating and moving the material along both of such hearths, means for transferring the rabble mechanism from one pair of tracks to the other, bumper mechanism on such rabble-supporting bars to contact with the hinged doors and apron to raise the same and hold them in raised position until the rabble mechanism passes thereunder, an endless flexible conveyer to receive the material from the ore-roasting chamber and convey it into the hopper from which it is discharged onto the cooling-hearth, a boot arranged adjacent to the receiving end of the ore-roasting hearth to be contacted by the rabble mechanism and move the material therein into and upon the ore-roasting hearth, a trough arranged at the discharge end of the cooling-hearth, and a screw conveyer in such trough to discharge the cooled product therefrom, substantially as described.

9. In an ore-roasting furnace of the class described, the combination of an ore-roasting hearth, a cooling-hearth arranged parallel with and above the same, a hinged door arranged at each end of the ore-roasting hearth, a hopper provided with a hinged chute or apron arranged at the receiving end of the cooling-hearth, a pair of tracks arranged outside of and parallel with both of such hearths, a plurality of rabble-trucks oppositely mounted on each of such pairs of tracks, a pair of link belts connecting such rabble-trucks together in a continuous manner, rabble-supporting bars connecting each pair of trucks together, rabble mechanism on such bars for agitating and moving the material along both of such hearths, means for transferring the rabble mechanism from one pair of tracks to the other, bumper mechanism on such rabble-supporting bars to contact with the hinged doors and apron to raise the same and hold them in raised position until the rabble mechanism passes thereunder, an endless flexible bucket conveyer to receive the material from the ore-roasting chamber and convey it into the hopper from which it is discharged into the cooling-hearth, a boot arranged adjacent to the receiving end of the ore-roasting hearth to be contacted by the rabble mechanism and move the material therein into and upon the ore-roasting hearth, a trough arranged at the discharge end of the cooling-hearth, and a screw conveyer arranged in such trough to discharge the material to one side of the furnace, substantially as described.

10. In an ore-roasting furnace of the class described, the combination of an ore-roasting hearth, a pair of tracks arranged parallel with and outside of the same, rabble-trucks provided with rabble mechanism mounted upon such tracks for agitating and moving material along the ore-roasting hearth, link-belt mechanism connected with such rabble-trucks to operate them in a continuous manner, shafts provided with sheave and sprocket wheels for operating such link belts, a main driver connected with one of such shafts, slide mechanism upon which at least one of said shafts is mounted, and means for operating such slides and moving the shaft, should the link belt break, to disconnect the operative mechanism and stop the machine, substantially as described.

11. In an ore-roasting furnace of the class described, the combination of an ore-roasting hearth, a pair of tracks arranged outside of and parallel with the ore-roasting hearth, rabble-trucks provided with rabble mechanism mounted on such tracks for agitating and moving the material along such hearth, link belts connecting such trucks for operating them in a continuous manner, driven shafts provided with sheave and sprocket wheels for operating the link belts, a main driver geared with at least one of the said shafts, slide-block mechanism in which one of the said shafts has its bearing, and a weighted chain connected with such sliding block to keep the link belt under tension and operate such sliding block, should either one or both the link belts become broken, to contact the driving mechanism and disengage it from the sprocket-driving mechanism, substantially as described.

12. In an ore-roasting furnace of the class described, the combination of an ore-roasting hearth, a pair of tracks arranged parallel with and outside of such hearth, a cooling-hearth arranged parallel with and above the ore-roasting hearth, a pair of tracks arranged parallel with and outside of the cooling-hearth, a plurality of rabble-trucks provided with rabble mechanism for agitating the moving material along both of such tracks, a pair of link belts connecting the rabble-trucks together in a continuous manner, a plurality of shafts provided with sheave and sprocket wheels for holding and driving the pair of link belts, a pair of slide-blocks supporting one of such shafts, a counter-shaft connected with one of the said shafts to transmit power and motion thereto, means for driving such counter-shaft, shipper mechanism for throwing the driving means into and out of engagement with the driving-shaft, and a weighted chain or similar element connected with the slide-blocks to hold the link belts under tension and, should either or both of such belts break, contact the shipper mechanism and disengage the driving means from the counter-shaft, substantially as described.

13. In an ore-roasting furnace of the class described, the combination of an ore-roasting hearth, a cooling-hearth arranged parallel therewith, a pair of tracks arranged outside of and parallel with such hearths, rabble-trucks provided with rabble mechanism mounted upon such tracks and provided with outwardly-extending arms $q'$, endless chains connected to such rabble-trucks at or near the outer edge thereof, a pair of sheave-pulleys provided with and mounted on rotatable shafts at each end of the furnace having annular flanges inclined inwardly at the outer edges thereof arranged to be contacted by the outwardly-extending arms $q'$ of the rabble-trucks thereby centering the rabble-trucks as they are passed from one hearth to the other, and means for driving the operative mechanisms, substantially as described.

DANIEL C. JACKLING.

Witnesses:
H. W. FOX,
C. A. PLATT.